US012574305B2

(12) United States Patent (10) Patent No.: US 12,574,305 B2

Randriamasy et al. (45) Date of Patent: Mar. 10, 2026

(54) NETWORK- AND COMPUTE-AWARE SERVICE CONTACT POINT SELECTION BASED ON GLOBAL-UTILITY VALUES

(71) Applicant: Nokia Solutions and Networks Oy, Espoo (FI)

(72) Inventors: Sabine Randriamasy, Meudon (FR); Bernard Sales, Biewart/Fernelmont (BE); Frédéric Faucheux, Paris (FR)

(73) Assignee: Nokia Solutions and Networks Oy, Espoo (FI)

( * ) Notice: Subject to any disclaimer, the term of this patent is extended or adjusted under 35 U.S.C. 154(b) by 44 days.

(21) Appl. No.: 18/594,471

(22) Filed: Mar. 4, 2024

(65) Prior Publication Data

US 2025/0279947 A1 Sep. 4, 2025

(51) Int. Cl.
*H04L 43/065* (2022.01)
*H04L 43/04* (2022.01)
*H04L 67/1008* (2022.01)
*H04L 67/101* (2022.01)

(52) U.S. Cl.
CPC ............ *H04L 43/065* (2013.01); *H04L 43/04* (2013.01); *H04L 67/1008* (2013.01); *H04L 67/101* (2013.01)

(58) Field of Classification Search
CPC ..... H04L 43/065; H04L 43/04; H04L 43/062; H04L 9/40; H04L 67/01; H04L 67/1001; H04L 67/1008; H04L 67/101; H04L 67/1029
See application file for complete search history.

(56) References Cited

U.S. PATENT DOCUMENTS 6,795,858 B1 * 9/2004 Jain ..................... H04L 67/1008
709/244
7,284,051 B1 * 10/2007 Okano ................ H04L 67/1029
709/224

(Continued)

FOREIGN PATENT DOCUMENTS

EP 2913979 B1 7/2019

OTHER PUBLICATIONS

Prabhu, Shailesh. "Cache-Assisted Service Contact Instance Selection for Computing-Aware Traffic Steering Networks." U.S. Appl. No. 18/440,070, filed Feb. 13, 2024 (19 pages).

(Continued)

*Primary Examiner* — Johnny B Aguiar

(74) *Attorney, Agent, or Firm* — Mendelsohn Dunleavy, P.C.; Steve Mendelsohn

(57) ABSTRACT

An off-path or in-path connection-ordering update (COU) function enables the relative priorities of network and compute metrics to be fine-tuned when generating global utility values used to generate a re-ordered list from an initial list of Internet Protocol (IP) addresses corresponding to a domain name identified by an application client. The initial list may contain IP addresses of edge servers corresponding to the domain name. The re-ordered list may contain either (i) the (re-ordered) edge-server IP addresses or (ii) IP address pairs identifying the (re-ordered) edge-server IP addresses and IP addresses of corresponding egress edge routers of an intervening routing network also having an ingress edge router connected to the application client.

18 Claims, 5 Drawing Sheets

200

(56) References Cited

U.S. PATENT DOCUMENTS

| | | | | | |
|---|---|---|---|---|---|
| 7,555,542 | B1 * | 6/2009 | Ayers | ...................... | H04L 61/35 |
| | | | | | 709/223 |
| 8,909,786 | B2 | 12/2014 | Lee et al. | | |
| 11,063,881 | B1 * | 7/2021 | Vijayasuganthan | .. | H04L 47/748 |
| 2004/0221061 | A1 * | 11/2004 | Chavez | .............. | H04L 67/1027 |
| | | | | | 709/245 |
| 2009/0292824 | A1 * | 11/2009 | Marashi | .............. | H04L 67/1001 |
| | | | | | 709/247 |
| 2014/0016467 | A1 | 1/2014 | Bernstein et al. | | |
| 2014/0040478 | A1 * | 2/2014 | Hsu | ..................... | H04L 67/1001 |
| | | | | | 709/226 |
| 2016/0352631 | A1 | 12/2016 | Medved et al. | | |
| 2018/0234488 | A1 | 8/2018 | Lee | | |
| 2018/0278570 | A1 * | 9/2018 | Dhanabalan | ........ | H04L 61/5007 |

OTHER PUBLICATIONS

Transitioning to latency-based routing in Amazon Route 53, www. amazon.com, 2016 [retrieved on May 14, 2024] Retrieved from the Internet: <URL: https://docs.aws.amazon.com/Route53/latest/ DeveloperGuide/TutorialTransitionToLBR.html> (3 pages).

BGP-LS, www.nokia.com, 2022 [retrieved on May 14, 2024] Retrieved from the Internet: <URL: https://infocenter.nokia.com/public/ 7750SR225R1A/index.jsp?topic=/com.nokia. Unicast_Guide/bgp-ls-ai9exj5ykf.html> (1 page).

"IETF 118 Side Meeting: Exposure of Communication and Compute information to Support Edge Computing Applications." Side Meeting Minutes, IETF 118. Prague, Czechia. <https://docs.google. com/document/d/1wCuU6uam_Yso8jPslgrvxWuXI_ DwpbnDBip5JFpzGdo/edit?usp=sharing> (Nov. 8, 2023): 1-3.

[draft-yao-cats-awareness-architecture-02] Yao, H., et al. "Computing and Network Information Awareness (CNIA) system architecture for CATS." Internet-Draft, <https://datatracker.ietf.org/doc/draft-yao-cats-awareness-architecture/> (Oct. 23, 2023): 1-17.

[draft-contreras-alto-service-edge-10] Contreras, L. M., et al. "Use of ALTO for Determining Service Edge." Internet-Draft, <https:// datatracker.ietf.org/doc/draft-contreras-alto-service-edge/> (Oct. 13, 2023): 1-41.

[draft-du-cats-computing-modeling-description-02] Du, Zongpeng, et al. "Computing Information Description in Computing-Aware Traffic Steering." Internet-Draft, <https://datatracker.ietf.org/doc/ draft-du-cats-computing-modeling- description/> (Oct. 23, 2023): 1-13.

[draft-dunbar-cats-edge-service-metrics-01] Dunbar, L., e tal. "5G Edge Services Use Cases ." Internet-Draft <https://datatracker.ietf. org/doc/draft-dunbar-cats-edge-service-metrics/> (Jul. 6, 2023): 1-19.

[draft-ietf-teas-rfc3272bis-27] Farrel, A., Ed., and Old Dog Consulting "Overview and Principles of Internet Traffic Engineering." Internet-Draft, <https://datatracker.ietf.org/doc/html/draft-ietf-teas-rfc3272bis-27> (Aug. 12, 2023): 1-91.

[draft-ldbc-cats-framework-04] Li, Cheng, Ed., Du, Z., et al., "A Framework for Computing-Aware Traffic Steering (CATS)", Work in Progress, Internet-Draft <https://datatracker.ietf.org/doc/html/ draft-ldbc-cats-framework-04>. (Dec. 8, 2023): 1-19.

[draft-rcr-opsawg-operational-compute-metrics-00] Randriamasy, S., et al. "Joint Exposure of Network and Compute Information for Infrastructure-Aware Service Deployment." Internet-Draft <https:// datatracker.ietf.org/doc/draft-rcr-opsawg-operational-compute-metrics/ 00/> (Oct. 23, 2023): 1-8.

[RFC7285] Alimi, R., Ed., et al. "Application-Layer Traffic Optimization (ALTO) Protocol." RFC 7285, DOI 10.17487/RFC7285, <https://www.rfc-editor.org/info/rfc7285> (Sep. 2014): 1-91.

[RFC7665] Halpern, J., Ed. and Pignataro, C. , Ed., "Service Function Chaining (SFC) Architecture", RFC 7665, DOI 10.17487/ RFC7665, <https://www.rfc-editor.org/rfc/rfc7665> (Oct. 2015): 1-32.

[RFC7971] Stiemerling, M., et al. "Application-Layer Traffic Optimization (ALTO) Deployment Considerations." RFC 7971, DOI 10.17487/RFC7971, <https://www.rfc-editor.org/info/rfc7971> (Oct. 2016): 1-77.

[RFC 8189] Randriamasy, S., et al. "Multi-Cost Application-Layer Traffic Optimization (ALTO)." RFC 8189, DOI 10.17487/RFC8189 <https://datatracker.ietf.org/doc/rfc8189/> (Oct. 2017): 1-29.

[RFC 8895] Roome, W., et al. "Application-Layer Traffic Optimization (ALTO) Incremental Updates Using Server-Sent Events (SSE)." RFC 8895, DOI 10.17487/RFC8895 <https://datatracker. ietf.org/doc/html/rfc8895> (Nov. 2020): 1-52.

[RFC 8896] Randriamasy, S., et al. "Application-Layer Traffic Optimization (ALTO) Cost Calendar." RFC 8896, DOI 10.17487/ RFC8896 <https://datatracker.ietf.org/doc/rfc8896/> (Nov. 2020): 1-35.

[RFC9420] Roome, W., et al. "An Extension for Application-Layer Traffic Optimization (ALTO): Entity Property Maps." RFC 9420, DOI 10.17487/RFC9240, <https://www.rfc-editor.org/info/ rfc9240> (Jul. 2022): 1-53.

[RFC9439] Wu, Q., et al. "Application-Layer Trafc Optimization (ALTO) Performance Cost Metrics." RFC 9439, DOI 10.17487/ RFC9439 <https://datatracker.ietf.org/doc/rfc9439/> (Aug. 2023): 1-35.

* cited by examiner

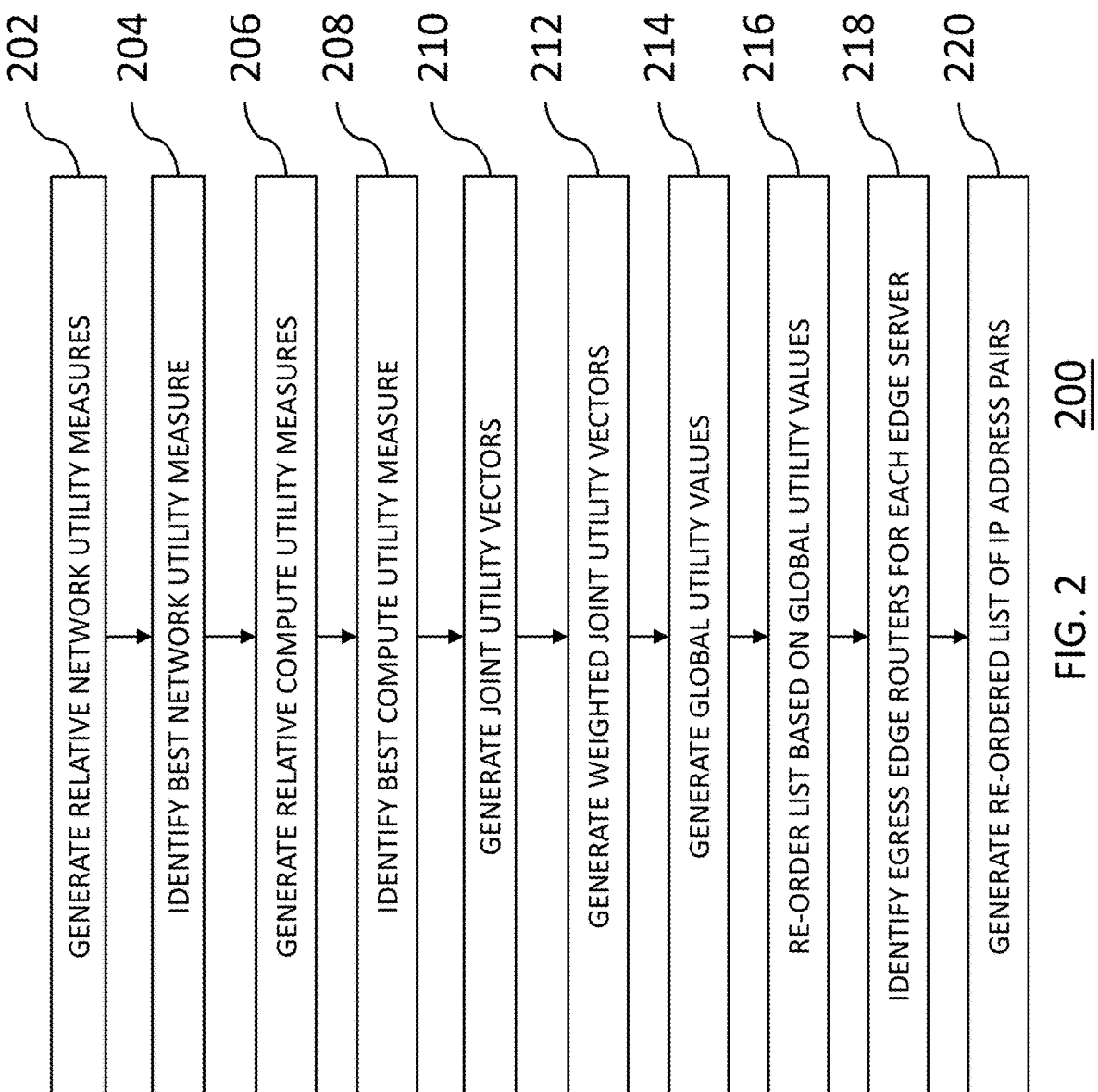

202 GENERATE RELATIVE NETWORK UTILITY MEASURES

204 IDENTIFY BEST NETWORK UTILITY MEASURE

206 GENERATE RELATIVE COMPUTE UTILITY MEASURES

208 IDENTIFY BEST COMPUTE UTILITY MEASURE

210 GENERATE JOINT UTILITY VECTORS

212 GENERATE WEIGHTED JOINT UTILITY VECTORS

214 GENERATE GLOBAL UTILITY VALUES

216 RE-ORDER LIST BASED ON GLOBAL UTILITY VALUES

218 IDENTIFY EGRESS EDGE ROUTERS FOR EACH EDGE SERVER

220 GENERATE RE-ORDERED LIST OF IP ADDRESS PAIRS

FIG. 2    200

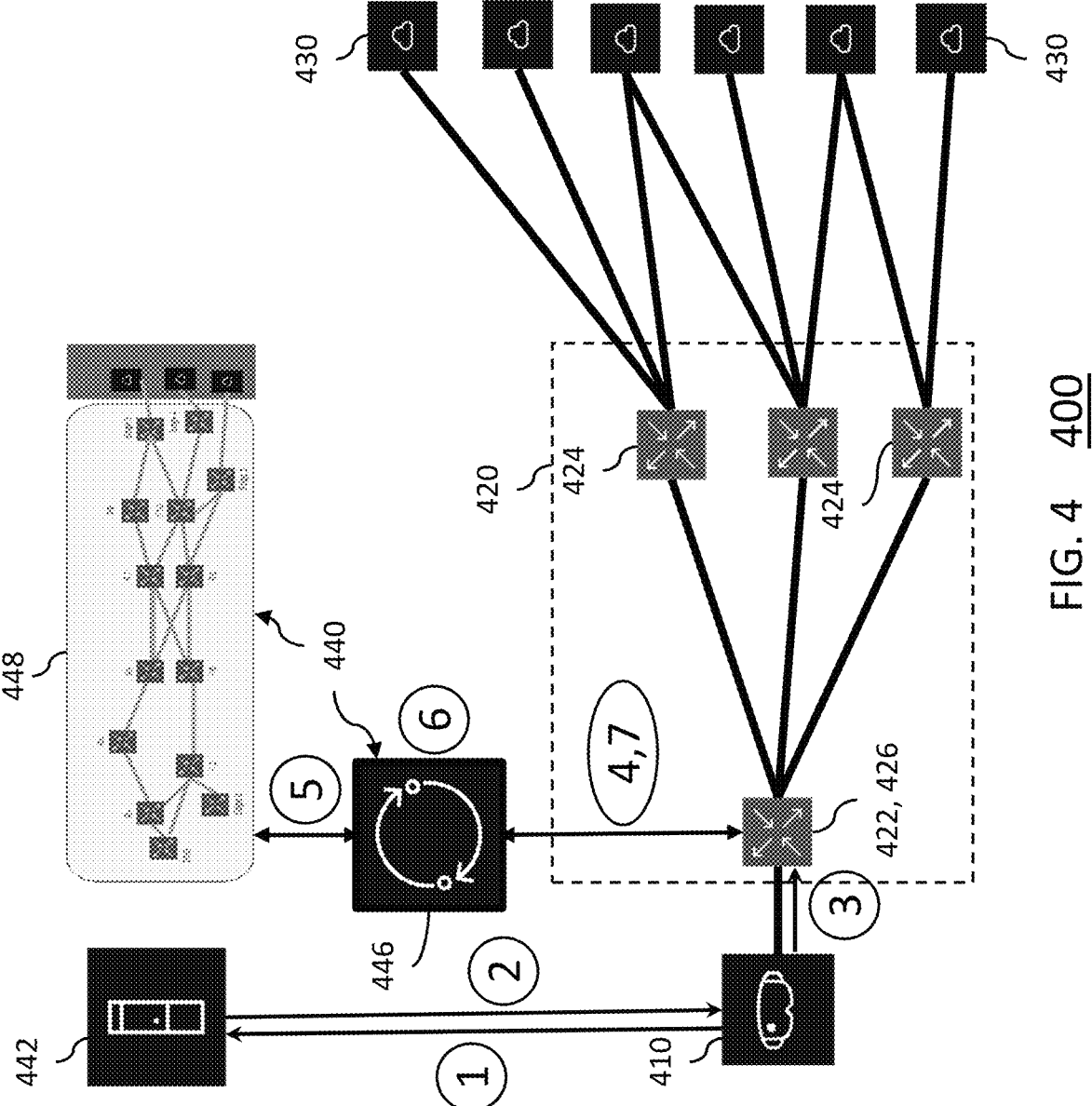
FIG. 4    400

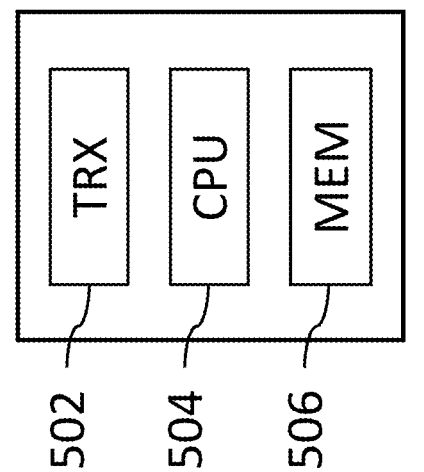
502
504
506
FIG. 5        500

NETWORK- AND COMPUTE-AWARE SERVICE CONTACT POINT SELECTION BASED ON GLOBAL-UTILITY VALUES

BACKGROUND

Field of the Disclosure

The present disclosure relates to communication systems and, more specifically but not exclusively, to the selection of service contact points in a communication system.

Description of the Related Art

This section introduces aspects that may help facilitate a better understanding of the disclosure. Accordingly, the statements of this section are to be read in this light and are not to be understood as admissions about what is prior art or what is not prior art.

It is known for a user of user equipment (UE) (e.g., a smart phone, tablet, laptop, smart television, etc.), who is interested in receiving some service (e.g., video or audio streaming, data access, etc.), to enter a fully qualified domain name associated with that service into an application client running on the UE, where the application client sends the domain name to a name resolution function, such as the DNS (Domain Name System), that, in response, sends back to the UE an ordered list of one or more acceptable Internet Protocol (IP) addresses, each IP address corresponding to a different service contact point that is able to provide the desired service to the application client, where the first IP address in the ordered list is used to connect the UE to the corresponding service contact point.

A conventional name resolution function, such as the DNS system, does not always arrange the IP addresses in the best possible manner, such that the first IP address in a DNS-generated list is not always the most-optimal IP address for the desired service in terms of certain specified criteria. To address this problem, the Compute-Aware Traffic Steering (CATS) working group (WG) at the Internet Engineering Task Force (IETF) is defining a framework to support the selection of optimal IP addresses from lists of IP addresses that can be generated by the DNS, to take those specified criteria into consideration.

According to the CATS technology, the client application forwards the original, DNS-generated list of IP addresses to an in-path CATS path selector (C-PS) function implemented, for example, in an ingress edge router of a routing network that is capable of connecting the client application to one of one or more egress edge routers of the routing network that are themselves variously connected to one or more service contact points implemented at one or more edge servers corresponding to the IP addresses in the original list. In order to generate a re-ordered list of IP addresses from the original, DNS-generated list, the C-PS function collects and uses (i) network metrics (such as (without limitation) latency, bandwidth, and jitter) from a CATS Network Metrics Agent (C-NMA) of the routing network and (ii) compute-resource metrics (such as (without limitation) processor utilization and memory load) from CATS Service Metrics Agents (C-SMAs) implemented at those egress edge routers.

According to the CATS technology, which is work in progress, in one option, the C-PS function uses the network metrics to select the best possible egress connected to the IP addresses in the original, DNS-generated list based on a network capabilities and metrics. The C-PS function then uses the corresponding compute metrics to select one of the IP addresses connected to the selected egress router. In this way, the CATS technology selects a service contact point for the desired service using an algorithm that prioritizes network metrics over compute metrics in a specific, fixed manner. In another option, the C-PS selects an IP address and then selects the egress router.

SUMMARY

There remains concern that the solutions implicitly suggested by the CATS documentation might still not result in sufficiently optimal selection of IP addresses for desired services. The present disclosure describes techniques for service contact point selection that enable selective fine-tuning of the relative priorities given to the network and compute metrics when re-ordering lists of IP addresses generated, for example, by a conventional name resolution function, such as a DNS resolver, thereby enabling selection of more-optimal IP addresses for those desired services than those provided by the CATS technology.

In at least one embodiment, the present disclosure is, in a system comprising an application client selectively connectable to any one of multiple edge servers by a routing network comprising (i) an ingress edge router connected to the application client and (ii) multiple egress edge routers connected variously to the multiple edge servers, a method for identifying one of the multiple edge servers for the application client, each edge server represented by a corresponding service contact point. The method comprises (a) receiving an initial list of IP addresses for the application client from a name resolution function of the system; (b) generating, for each IP address in the initial list, a global utility value based on (i) a corresponding set of one or more network metrics and (ii) a corresponding set of one or more compute metrics; and (c) re-ordering the initial list based on the corresponding global utility values to generate a re-ordered list of the IP addresses for the application client, wherein the edge server for the client application is selectable based on the re-ordered list.

In at least some of the above embodiments, each item in the re-ordered list is an IP address pair comprising (i) an IP address for one of the multiple egress edge routers and (ii) an IP address for one of the multiple edge servers; and the egress edge router and the edge server for the client application are selectable based on the re-ordered list.

In at least some of the above embodiments, generating the global utility value for each IP address in the initial list comprises (1) generating a relative network utility measure based on the corresponding set of one or more network metrics; (2) generating a relative compute utility measure based on the corresponding set of one or more compute metrics; (3) generating a joint utility vector based on the corresponding relative network utility measure and the corresponding relative compute utility measure; (4) generating a weighted joint utility vector based on the corresponding joint utility vector; and (5) generating the global utility value based on the corresponding weighted joint utility vector.

In at least some of the above embodiments, for each IP address in the initial list, (i) the set of network metrics comprises two or more different network metrics; (ii) the relative network utility measure is generated using the two or more different network metrics as vector elements in a network-metric-vector-based evaluation; (iii) the set of compute metrics comprises two or more different compute metrics; (iv) the relative compute utility measure is generated using the two or more different compute metrics as vector elements in a compute-metric-vector-based evaluation; and (v) the network-metric-vector-based evaluation is separate from the compute-metric-vector-based evaluation.

In at least some of the above embodiments, for each IP address in the initial list, (A) the joint utility vector is generated by (1) generating a normalized network utility measure based on (i) the corresponding relative network utility measure and (ii) the best relative network utility measure for all of the IP addresses in the initial list and (2) generating a normalized compute utility measure based on (i) the corresponding relative compute utility measure and (ii) the best relative compute utility measure for all of the IP addresses in the initial list, (B) the weighted joint utility vector is generated by (1) multiplying the normalized network utility measure by a network weight factor and (2) multiplying the normalized compute utility measure by a compute weight factor; and (C) the global utility value is generated based on length of the weighted joint utility vector.

In at least some of the above embodiments, the method is performed by an off-path function of the system.

In at least some of the above embodiments, the off-path function (i) selects the edge server for the application client based on a first item in the re-ordered list and (ii) sends a message to the application client identifying the selected edge server.

In at least some of the above embodiments, the off-path function (i) selects the egress edge router and the edge server for the application client based on a first IP address pair in the re-ordered list, (ii) sends a message to the application client with the initial list of IP addresses, and (iii) sends a message to the ingress edge router identifying the selected egress edge router and the selected edge server or a corresponding routing policy.

In at least some of the above embodiments, the off-path function sends the re-ordered list to the application client.

In at least some of the above embodiments, the method is performed upon receipt of a request sent by an in-path client implemented at the ingress edge router.

In at least one embodiment, the present disclosure is an apparatus for a system comprising an application client selectively connectable to any one of multiple edge servers by a routing network comprising (i) an ingress edge router connected to the application client and (ii) multiple egress edge routers connected variously to the multiple edge servers, each edge server represented by a corresponding service contact point. The apparatus comprises at least one processor and at least one memory storing instructions that, upon being executed by the at least one processor, cause the apparatus at least to (1) receive an initial list of IP addresses for the application client from a name resolution function of the system; (2) generate, for each IP address in the initial list, a global utility value based on (i) a corresponding set of one or more network metrics and (ii) a corresponding set of one or more compute metrics; and (3) re-order the initial list based on the corresponding global utility values to generate a re-ordered list of the IP addresses for the application client, wherein the edge server for the client application is selectable based on the re-ordered list.

In at least some of the above embodiments, (A) each item in the re-ordered list is an IP address pair comprising (i) an IP address for one of the multiple egress edge routers and (ii) an IP address for one of the multiple edge servers and (B) the egress edge router and the edge server for the client application are selectable based on the re-ordered list.

In at least some of the above embodiments, the apparatus is adapted to generate the global utility value for each IP address in the initial list by (1) generating a relative network utility measure based on the corresponding set of one or more network metrics; (2) generating a relative compute utility measure based on the corresponding set of one or more compute metrics; (3) generating a joint utility vector based on the corresponding relative network utility measure and the corresponding relative compute utility measure; (4) generating a weighted joint utility vector based on the corresponding joint utility vector; and (5) generating the global utility value based on the corresponding weighted joint utility vector.

In at least some of the above embodiments, for each IP address in the initial list, (A) the set of network metrics comprises two or more different network metrics; (B) the apparatus is adapted to generate the relative network utility measure using the two or more different network metrics as vector elements in a network-metric-vector-based evaluation; (C) the set of compute metrics comprises two or more different compute metrics; (D) the apparatus is adapted to generate the relative compute utility measure using the two or more different compute metrics as vector elements in a compute-metric-vector-based evaluation; and (E) the network-metric-vector-based evaluation is separate from the compute-metric-vector-based evaluation.

In at least some of the above embodiments, for each IP address in the initial list, (A) the apparatus is adapted to generate the joint utility vector by (1) generating a normalized network utility measure based on (i) the corresponding relative network utility measure and (ii) the best relative network utility measure for all of the IP addresses in the initial list and (2) generating a normalized compute utility measure based on (i) the corresponding relative compute utility measure and (ii) the best relative compute utility measure for all of the IP addresses in the initial list; (B) the apparatus is adapted to generate the weighted joint utility vector by (1) multiplying the normalized network utility measure by a network weight factor and (2) multiplying the normalized compute utility measure by a compute weight factor; and (C) the apparatus is adapted to generate the global utility value based on length of the weighted joint utility vector.

In at least some of the above embodiments, the apparatus is adapted to operate as an off-path function of the system.

In at least some of the above embodiments, the off-path function is adapted to (i) select the edge server for the application client based on a first item in the re-ordered list and (ii) send a message to the application client identifying the selected edge server.

In at least some of the above embodiments, the off-path function is adapted to (i) select the egress edge router and the edge server for the application client based on a first IP address pair in the re-ordered list, (ii) send a message to the application client with the initial list of IP addresses, and (iii) send a message to the ingress edge router identifying the selected egress edge router and the selected edge server or a corresponding routing policy.

In at least some of the above embodiments, the off-path function is adapted to send the re-ordered list to the application client.

In at least some of the above embodiments, the off-path function is adapted to operate upon receipt of a request sent by an in-path client implemented at the ingress edge router.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 2 is a flow diagram illustrating one possible algorithm implemented by the COU function of FIG. 1;

FIG. 4 is a block diagram of an example communication system that implements an in-path SCPS function; and FIG. 5 is a simplified hardware block diagram of an example node that can be used to implement any of the nodes of FIGS. 1, 3, and 4.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
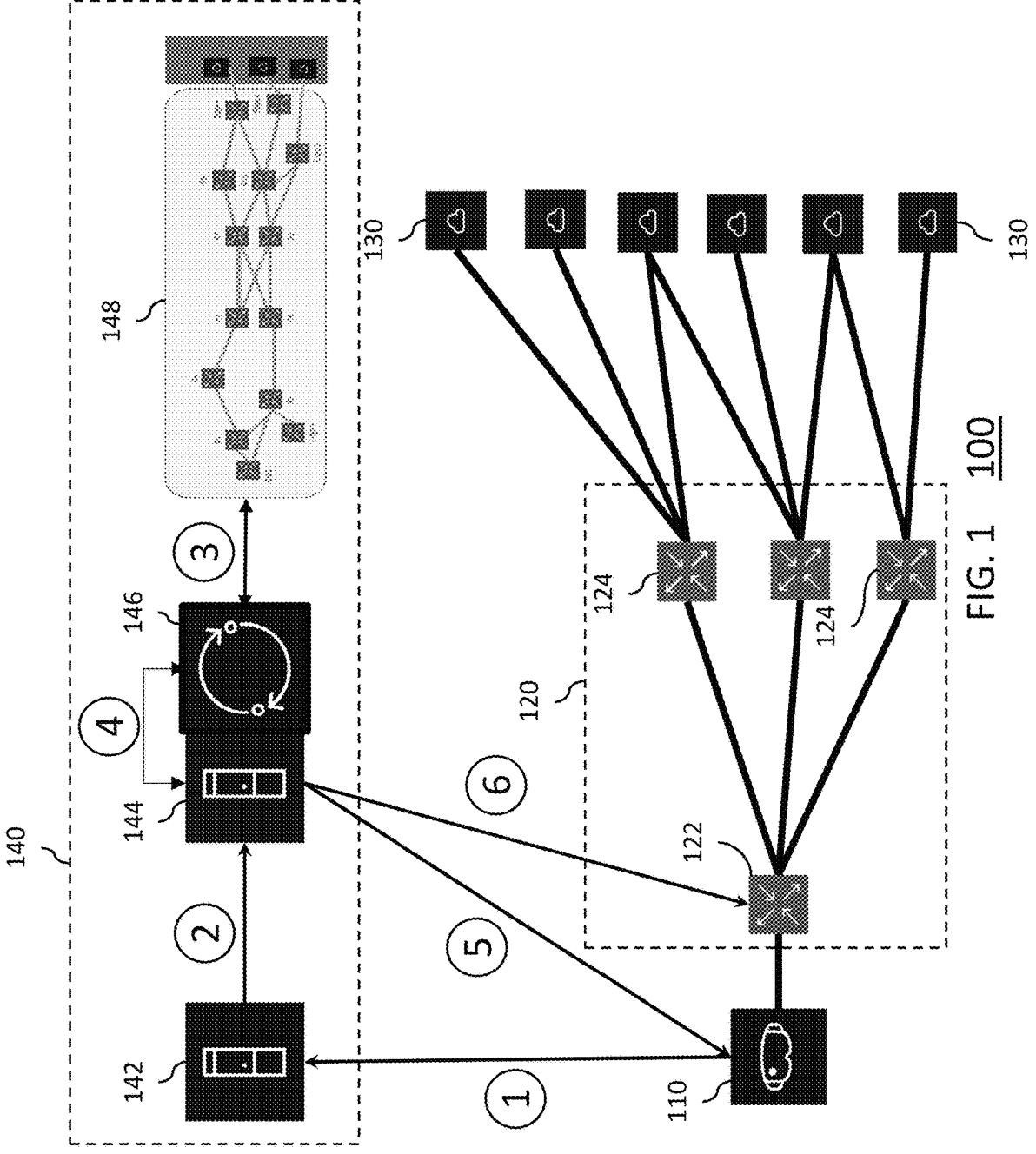
FIG. 1 is a block diagram of an example communication system that implements a DNS-based off-path service contact point selection (SCPS) function.

FIG. 1 is a block diagram of an example communication system 100 in which an application (app) client 110 running on a UE wants to access a service that can be provided by any one of a number of service contact points running on different edge servers 130 or their service contact point, where the app client 110 accesses the desired service via a routing network 120 having (i) an ingress edge router 122 connected to the app client 110 and (ii) a number of egress edge routers 124 variously connected to those edge servers 130 or their service contact point. As used herein, the term "edge server" refers collectively to implementations in which the service contact point is implemented within the edge server as well as implementations in which the service contact point is implemented separate from the edge server. In either case, the service contact point is often a load balancer.

Although not shown in FIG. 1, those skilled in the art will understand that (i) the ingress edge router 122 may be connected to one or more additional UEs, (ii) each edge server 130 may provide one or more other services, (iii) each egress edge router 124 may be connected to one or more additional edge servers 130 that provide other services, (iv) a typical routing network 120 will have one or more additional ingress edge routers connected to other UEs and one or more additional egress edge routers connected to the same and/or other edge servers, and (v) the ingress edge routers are connected to the egress edge routers by a fabric of interconnected internal routers/switches (e.g., a mesh network) of the routing network 120.

In the communication system 100 of FIG. 1, in order to access the desired service, the app client 110 sends a fully qualified domain name for the service to an off-path service contact point selection (SCPS) function 140. In some implementations, the off-path SCPS function 140 generates a list of IP addresses for the edge servers 130 that can support the desired service, where the edge-server IP addresses are arranged in the list from most-optimal edge server 130 to least-optimal edge server 130. In other implementations, the off-path SCPS function 140 generates a list of IP address pairs for the desired service arranged from most-optimal IP address pair to least-optimal IP address pair, where each IP address pair contains (i) the IP address of one of the egress edge routers 124 and (ii) the IP address of one of the edge servers 130 connected to that egress edge router 124. In either case, the list is ordered based on specific criteria used by the off-path SCPS function 140, as described further below in the context of FIG. 2.

As used herein, the term "off-path" means outside the network path, while the term "in-path" means within the network path. Furthermore, the term "off-path utilization mode" means the result of the selection is utilized by an entity located outside the network path, the term "in-path utilization mode" means the result of the selection is utilized by an entity located within the network path, and the term "in-path execution mode" means the selection is triggered by an entity that is located within the network path and its result is utilized by an entity located within the network path.

Depending on the particular implementation, the off-path SCPS function 140 sends to the app client 110 and/or to the ingress edge router 122, information used to connect the app client 110 to the most-optimal edge server 130. In some implementations, that information identifies both the most-optimal edge server 130 and the corresponding most-optimal egress edge router 124 connected to that most-optimal edge server 130. In other implementations, the information from the off-path SCPS function 140 does not identify the most-optimal egress edge router 124, which is instead selected by other routing functionality in the communication system 100.

In the particular embodiment shown in FIG. 1, the off-path SCPS function 140 is a DNS-based solution comprising (i) a conventional, application-side A-DNS server 142, which functions as the name resolution function, (ii) a network-side DNS-R server 144, (iii) a connection-ordering update (COU) function 146, and (iv) an infrastructure topology server 148, which contains information about the connections within and to the routing network 120, including the connections between the egress edge routers 124 and the edge servers 130.

In some implementations, the topology server 148 is an Application Layer Transport Optimization (ALTO) server that is extended to expose properties on the edge servers 130 that reflect their compute capabilities. Edge servers 130 can be considered as ALTO entities whose properties can be exposed as specified in IETF RFC 9240. A number of standardization groups such as the IETF are looking at defining and standardizing compute-related properties and many possible metrics at different levels of abstraction can be used. Some implementations introduce a generic metric that can be named "computingcost" and is applied to an edge server 130, to reflect the network operator policy and preferences. The metric "computingcost" results from an abstraction method that is hidden from users, similarly to the metric "routingcost" defined in IETF RFC 7285. For instance, "computingcost" may be higher for an edge server 130 located far away, or in disliked geographical areas, or owned by a provider who does not share information with the Internet Service Provider (ISP) or with which ISP has a poorer commercial agreement. "computingcost" may also reflect environmental preferences in terms, for instance, of energy source, average consumption vs. local climate, location adequacy vs. climate. Some other implementations introduce another generic metric named "computingperf", applied to an edge server 130, that reflects its performances, based on measurements or estimations by the ISP or combination thereof. An edge server 130 with a higher "computingperf" value will be preferred. "computingperf" can be based on a vector of one or more metrics reflecting, for instance, responsiveness, reliability of cloud services based on metrics such as latency, packet loss, jitter, time to first and/or last byte, or a single value reflecting a global performance score.

In certain implementations, the conventional A-DNS server 142 generates an initial list of edge-server IP addresses for a domain name specified by the app client 110, and the COU function 146 re-arranges that initial list (if required) to generate a re-ordered list of address pairs. (In general, a COU client function accesses the COU function. In the off-path embodiment of FIG. 1, the COU client is implemented at the DNS-R server 144. As discussed further below, in the off-path embodiment of FIG. 3, the COU client is implemented at the non-DNS server 342, and, in the in-path embodiment of FIG. 4, the COU client 426 is implemented at the ingress edge router 422. In other embodiments, not shown in the figures, the COU client is implemented at the app client.)

In particular, as shown in FIG. 1, the processing begins at Step 1 with the app client 110 sending the domain name for the desired service to the A-DNS server 142. As known in the art, in Step 2, the A-DNS server 142 generates and sends to the DNS-R server 144 the initial list of IP addresses for the edge servers 130 that can provide the service corresponding to the domain name, which initial list is available to the COU function 146.

In Step 3, for each edge server 130 identified in the initial list, the COU function 146 (i) receives a corresponding set of one or more network metrics and a corresponding set of one or more compute metrics and (ii) accesses the infrastructure topology server 148 to receive topology information about the routing network 120 including the various connections between the egress edge routers 124 and the edge servers 130. The topology server 148 also provides network metrics reflecting the costs, capabilities, and states of the network paths to the egress edge routers 124 connected to the edge servers 130. The topology server 148 also provides compute metrics reflecting the costs, states, and capabilities of the edge servers 130.

In Step 4, the COU function 146 uses the topology information and the network and compute metrics (as described below in the context of FIG. 2) to generate the re-ordered list of edge-server IP addresses, which re-ordered list is available to the DNS-R server 144.

In some implementations, in Step 5, the DNS-R server 144 sends the entire re-ordered list of IP addresses of the edge servers 130 to the app client 110. The first IP address in the list is identified as preferred. In addition, as described further below in the context of FIG. 4, in some implementations, in Step 5, the DNS-R server 144 sends an anycast address comprising the entire set of non-ordered IP addresses of the eligible servers to the app client 110, while, in Step 6, the COU function 146 sends the routing instructions associated to this anycast address to the ingress edge router 122. These instructions are based on the first IP address pair of edge server 130 and egress edge router 124 in the re-ordered list and indicate that incoming packets having this anycast destination should be sent to the edge server 130 via the egress edge router 124 indicated in this IP address pair. In any case, depending on the implementation, either the app client 110 or the ingress edge router 122 uses the information received from the DNS-R server 144 and possibly the COU function, to connect the app client 110 to the identified edge server 130, possibly via the identified egress edge router 124, to enable the app client 110 to access the desired service.

FIG. 2 is a flow diagram illustrating one possible algorithm 200 implemented by the COU function 146 in Step 4 of FIG. 1 to generate the re-ordered list of IP address pairs from the initial list of edge-server IP addresses.

In Step 202, for each of the different edge servers 130 identified in the initial list, the COU function 146 uses the received network metrics to generate a relative network utility measure UN(i), where i identifies the ith edge server 130. The network utility reflects the network path to the ith edge server 130 via the egress edge router 124 currently used to reach the ith edge server 130. In some implementations, the COU function 146 executes a vector-based algorithm based on one or more different network metrics to generate the network utility measures UN.

The first step in one possible implementation of the algorithm is to generate normalized component values of a vector VN(i) conveying the network metrics of the ith edge server 130, where each component Ck of the vector VN(i) corresponds to a different network metric and must have a positive value. If the components Ck are network metric measurements that are not already normalized in (0, 1), then generate a so-called ideal vector VN\*, where each component Ck\* is the best observed value for the corresponding component Ck for all of the different edge servers 130 identified in the initial list. Note that, depending on the particular network metric, the "best" value may be the largest value or the smallest value. For example, for bandwidth, the best value will be the largest value, while, for jitter or latency, the best value will be the smallest value.

For the ith edge server 130, normalize each component Ck(i) by computing a distance between itself and the best observed value. To this end, apply Ck(i)=MIN(Ck\*, Ck(i))/MAX(Ck\*, Ck(i)). If component Ck is to be minimized and Ck(i)=0, then UNK(i)=1. If component Ck is to be minimized and Ck\*=0, then Ck(i)=1 for all edge servers 130 realizing Ck(i)=0. If more solutions i need to be selected, then normalize on the edge servers 130 whose Ck(i) is not null and subtract from their normalized value, a quantity proportional to k\*MIN(Ck(i)/MAX(Ck(i) with 0<k<=1. If component Ck is to be maximized and Ck\*=0, then set Ck(i)=0 for all i.

Once the vector components Ck(i) have been normalized, compute the relative network utility measure UN(i) as a weighted sum of the Ck(i), where each weight wk reflects the importance given to metric k in the utility measure UN(i). Whatever the initial value of the weights, divide each weight wk by the sum of the initial weights to ensure that the sum of wk=1.

In Step 204, for all of the different edge servers 130 identified in the initial list, the COU function 146 selects the best relative network utility measure UN* from all the relative network utility measures UN generated in Step 202.

In Step 206, for each of the different edge servers 130 identified in the initial list, the COU function 146 uses the received one or more compute metrics to generate a relative compute utility measure UC(i). In some implementations, the COU function 146 generates the compute utility measures UC using a vector-based algorithm based on compute metrics that is analogous to the vector-based algorithm of Step 202. Note that, in these implementations, the vector-based algorithm for generating the network utility measures UN is executed separately from (i.e., independent of) the vector-based algorithm for generating the compute utility measures UC, and vice versa.

In Step 208, for all of the different edge servers 130 identified in the initial list, the COU function 146 selects the best relative compute utility measure UC* from all the relative compute utility measures UC generated in Step 206.

In Step 210, for each edge server 130 identified in the initial list, the COU function 146 generates a joint utility vector (VUN(i), VUC(i), where:

VUN(i) is a normalized network utility measure given by (MIN(UN(i), UN*)/MAX(UN(i), UN*));

VUC(i) is a normalized compute utility measure given by (MIN(UC(i), UC*)/MAX(UC(i), UC*));

MIN returns the minimum of the two values;

MAX returns the maximum of the two values; and

"/" indicates division.

In Step 212, for each edge server 130 identified in the initial list, the COU function 146 generates a weighted joint utility vector (Wn*VUN(i), Wc*VUC(i)) from the corresponding joint utility vector (VUN(i), VUC(i)) from Step 210, where Wn and Wc are network and compute weight factors, respectively, that reflect the relative priorities given to the network and compute metrics with (Wn+Wc) (preferably but not necessarily) equal to 1. Those skilled in the art will understand that the values selected for the network and compute weight factors Wn and Wc can be used to fine-tune the relative priorities given to the network and computer metrics, respectively, when re-ordering the initial list of edge-server IP addresses, with larger weight factor values corresponding to higher priority. Note that UN(i) and UC(i) as computed in Steps 202 and 206 are already normalized values in (0, 1). In that case, Steps 204, 208, and 210 can be skipped and Step 212 can be executed with VUN(i)=UN(i) and VUC(i)=UC(i). When it is not ensured that the values UN(i) and UC(i) are normalized and computed as in Steps 202 and 206, it is necessary to execute all steps from Step 202 to Step 212.

In Step 214, for each edge server 130 identified in the initial list, the COU function 146 generates a global utility value U(i) as the length of the corresponding weighted joint utility vector (Wn*VUN(i), Wc*VUC(i) of Step 212.

In Step 216, the COU function 146 re-orders the edge-server IP addresses identified in the initial list based on their corresponding global utility values U(i) from highest to lowest to generate a re-ordered list of edge-router IP addresses.

In some implementations as described in FIG. 1, the COU function 146 returns the re-ordered list of edge-server IP addresses of step 216 to the DNS-R server 144, which sends that re-ordered list to the app client 110 in Step 5 of FIG. 1. This can be named the "off-path utilization mode". In other implementations that can be named "in-path utilization mode", the COU function 146 identifies all the egress edge routers 124 that can be used to reach an edge server 130 to order all the IP address pairs with respect to their network and compute utility. To this end, in Step 3 of FIG. 1, the COU function 146 gets the corresponding network and compute metrics for all of the IP address pairs from the topology server 148 and executes Steps 202 to 216 of the algorithm 200 of FIG. 2 for each pair of egress edge router 124 and connected edge server 130. In the "in-path utilization mode", in Step 218, the global utility value computed in Step 216 is explicitly associated to each IP address pair.

In the "in-path utilization mode", in Step 220, the COU function 146 uses all of the IP address pairs from Step 218 to generate the re-ordered list of IP address pairs. The example embodiment of FIG. 1 has six edge servers 130i, i=1, . . . ,6, and three egress edge routers 124j, j=1, . . . , 3, that are connected to the six edge servers 130i. In the "off-path utilization mode", for each edge server 130i, the best egress edge server 124j has already been selected. As such, in Step 210, six joint utility vectors (VUC(i), VUN(i)) pairs are computed, yielding six global utility values U(i) in Step 214. In the "in-path utilization mode", the COU function 146 simultaneously selects the edge server 130i and the egress edge router 124j used to reach each edge server 130i. To this end, in Step 210, the COU function 146 computes, for each edge server 130i and for each egress edge router 124j connected to this edge server 130i, a corresponding joint utility vector (VUC(i), VUN(j)) pair. In the example of FIG. 1, the six edge servers 130i from top to bottom can be reached via respectively 1, 1, 2, 1, 2, and 1 possible egress edge routers 124j, respectively. This yields the computation of eight global utility values U(ij) in Step 214. The computation method for each joint utility vector (VUC(i), VUN(j) is the same for both the "off-path utilization mode" and the "in-path utilization mode". The "off-path utilization mode" orders six global utility values U(i) in Step 216. The "in-path utilization mode" orders eight global utility values U(ij) in Step 216 and each of these U(ij) is associated to an IP address pair.

In some implementations, the weights Wn and Wc of Step 212 associated to the utility measures UN and UC depend on so-called context parameters such as application type. In other implementations, the metrics Mk selected for the vectors conveying the network and compute capabilities depend on the other context parameters such application type and policy, while their weight wk depend on time, date, particular holiday or event, disruptive event causing outage such as bad weather, accident, maintenance break, UE capabilities in display, memory. For example, an application may require, in principle, high bandwidth or be compute-intensive, but, in some periods of a day, the network and compute infrastructure is not busy and the weights for these metrics may be adjusted accordingly. The values of Wn and Wc, Mk and wk are adapted upon evaluation of the QoE conducted for the selected edge servers 130 and their network paths and in association with a given set of context parameters. The number of satisfactory tests will be reflected in a confidence indicator. The values of Wn and Wc, Mk and wk can be stored in a cache and can be automatically selected by the COU function 146 when (i) the context parameters are comparable and (ii) they are associated to a confidence indicator value reflecting their reliability.

Although the disclosure has been described in the context of the particular algorithm 200 shown in FIG. 2, those skilled in the art will understand that there are other suitable ways for taking into account network and compute metrics to generate global utility values that enable selective fine-tuning of the relative priorities given to those network and compute metrics when re-ordering initial lists of edge-server IP addresses.

Although the disclosure has been described in the context of the DNS-based, off-path SCPS function 140 shown in FIG. 1, those skilled in the art will understand that the disclosure can also be implemented in the context of non-DNS-based off-path SCPS functions and in the context of in-path SCPS functions.

Figure 3:
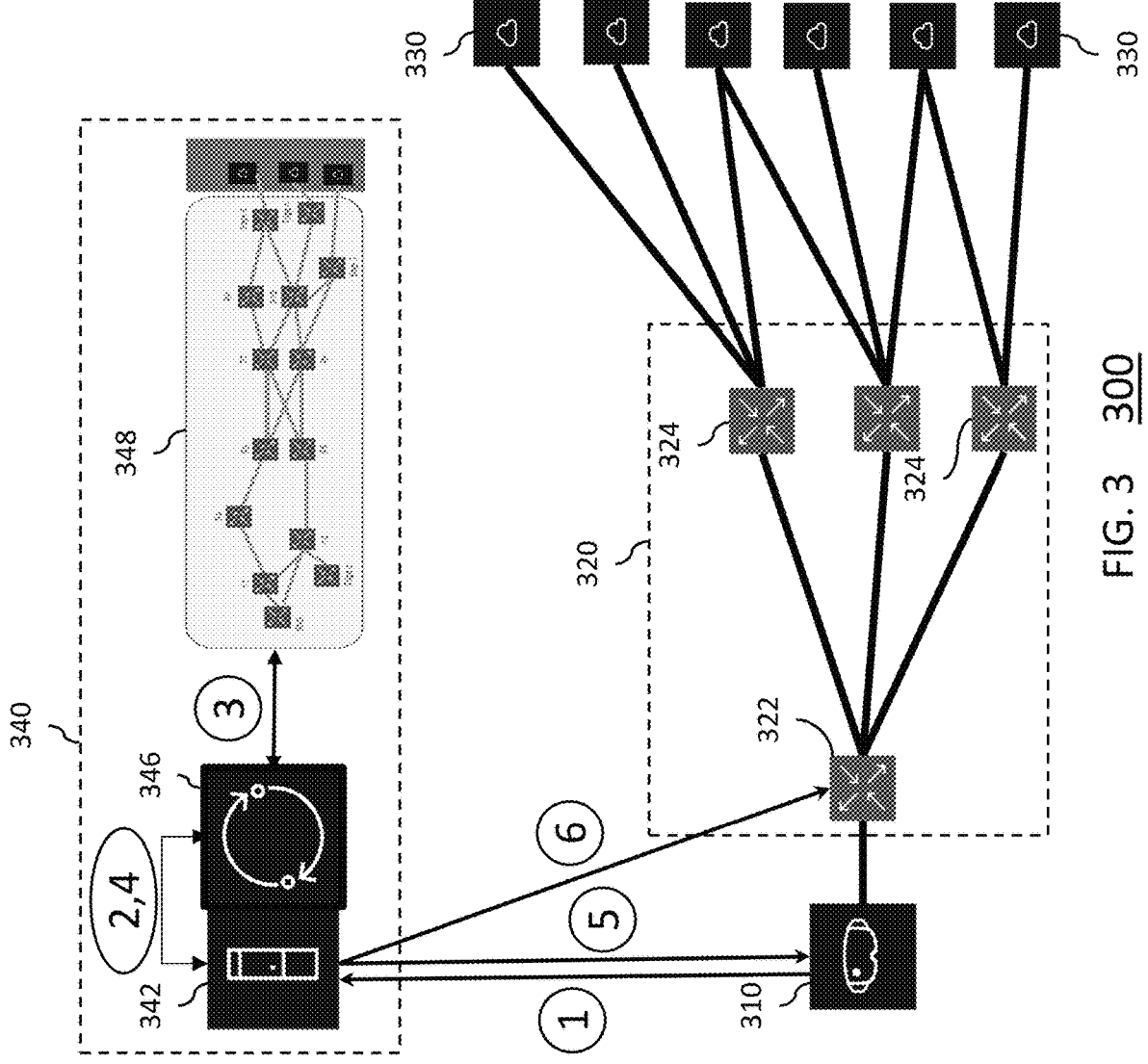
FIG. 3 is a block diagram of an example communication system that implements a non-DNS-based off-path SCPS function.

FIG. 3 is a block diagram of an example communication system 300 that implements a non-DNS-based off-path SCPS function 340. Communication system 300 is analogous to communication system 100 of FIG. 1 with analogous elements having analogous labels 310-348 except that, instead of the A-DNS server 142 and the DNS-R server 144 of FIG. 1, communication system 300 has a non-DNS server 342 that generates the initial list of edge-server IP addresses for the SCPS function 340. Those skilled in the art will understand that the non-DNS server 342 may be any suitable name resolution function that generates a list of viable edge-server IP addresses for a specified domain name. In the embodiment of FIG. 3, the off-path COU function 346 implemented in the non-DNS server 342 performs the same operations as the off-path COU function 146 of FIG. 1, including the algorithm 200 of FIG. 2.

FIG. 4 is a block diagram of an example communication system 400 that implements an in-path execution mode of the SCPS function 440. Communication system 400 is analogous to communication system 100 of FIG. 1 with analogous elements having analogous labels 410-448 with the following primary exception. As shown in FIG. 4, a COU client 426 of the COU function 446, which performs the same operations as the COU function 146 of FIG. 1, including the algorithm 200 of FIG. 2, is implemented "in path" at the ingress edge router 422. In the "in-path utilization mode", in particular sporadic circumstances such as network degradation, a COU client 426 in an ingress edge router 422 may ask the (centralized) COU function 446 to recompute a selection associated with the initial list. For example, the COU client 426 can send an alarm to the COU function 446 with the initial list or an identifier thereof, with specific indicators of a request to return an updated routing policy for this identifier. The COU client 426 can communicate with the COU function 446 with a protocol such as the Path Computation Element Protocol (PCEP) with the appropriate options or extensions thereof.

In particular, as shown in FIG. 4, in Step 1, the app client 410 sends the domain name for the desired service to a suitable name resolution function 442, which, in Step 2, generates and sends back to the app client 410 the initial list of edge-server IP addresses. In Step 3, the app client 410 sends the initial list to the ingress edge router 422, where the initial list is available to the COU client 426. In Step 4, the COU client sends to the COU function 446 the initial list, together with a request to return the routing policy corresponding to the best IP address pair in the re-ordered list of IP address pairs.

In Step 5, the COU function 446 accesses the infrastructure topology server 448 to receive network and compute metrics and retrieve network topology information, as in Step 3 of FIG. 1. In Step 6, the COU function 446 uses the network and compute metrics and the network topology information to generate the re-ordered list of IP address pairs, as in Step 4 of FIG. 1. In Step 7, the COU function 446 sends the corresponding routing policy back to the COU client 426. Since, in this in-path solution, the re-ordered list is local to the ingress edge router 422, the ingress edge router 422 uses the first IP address pair in the re-ordered list to connect the app client 410 to the corresponding egress edge router 424 and the corresponding edge server 430 to enable the app client 410 to access the desired service. What is shown in FIG. 4 may be named "in-path execution mode" and is preferably triggered sporadically, for instance, in the presence of network problems detected by the ingress edge router 422.

Currently, a best common practice is to send DNS requests every 15 minutes, and the frequency of 15 minutes is often considered as a lack of dynamicity. In some implementations when the "off-path utilization mode" is used, the COU function is solicited by the COU client co-located with the application client to receive an ordering update of the edge server list. The re-ordering requests are sent to the COU function between two DNS requests, for example, when the quality of experience (QoE) degradation exceeds a given threshold in the connection with the connected edge server. According to the DNS protocol, these intermediate re-ordering updates cannot be conveyed to DNS clients, and are thus returned to the COU client.

Whether implemented off path or on path, the COU functions of the present disclosure re-order (as needed) initial lists of edge-server IP addresses into either re-ordered lists of just edge-server IP addresses or re-ordered lists of IP address pairs using an algorithm that enables fine-tuning of the relative priorities given to network and compute metrics.

FIG. 5 is a simplified hardware block diagram of an example node 500 that can be used to implement any of the nodes of FIGS. 1, 3, and 4. As shown in FIG. 5, the node 500 includes (i) communication hardware (e.g., wireless, wireline, and/or optical transceivers (TRX)) 502 that supports communications with other nodes, (ii) a processor (e.g., CPU microprocessor) 504 that controls the operations of the node 500, and (iii) a memory (e.g., RAM, ROM) 506 that stores code executed by the processor 504 and/or data generated and/or received by the node 500.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. Upon being provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, upon the program code being loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, upon the program code being loaded into and executed by a machine, such as a computer, the machine becomes an apparatus for practicing the disclosure. Upon being implemented on a general-purpose processor, the program code segments combine with the processor to provide a unique device that operates analogously to specific logic circuits. The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

All documents mentioned herein are hereby incorporated by reference in their entirety or alternatively to provide the disclosure for which they were specifically relied upon.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. In a system comprising an application client selectively connectable to any one of multiple edge servers by a routing network comprising (i) an ingress edge router connected to the application client and (ii) multiple egress edge routers connected variously to the multiple edge servers, a method for identifying one of the multiple edge servers for the application client, each edge server of the multiple edge servers represented by a corresponding service contact point, the method comprising:

receiving an initial list of Internet Protocol (IP) addresses for the application client from a name resolution function of the system;

generating, for each IP address in the initial list, a global utility value based on (i) a corresponding set of one or more network metrics and (ii) a corresponding set of one or more compute metrics; and re-ordering the initial list based on corresponding global utility values to generate a re-ordered list of the IP addresses for the application client, wherein an edge server for the client application is selectable based on the re-ordered list, wherein generating the global utility value for each IP address in the initial list comprises:

generating a corresponding relative network utility measure based on the corresponding set of one or more network metrics;

generating a corresponding relative compute utility measure based on the corresponding set of one or more compute metrics:

generating a corresponding joint utility vector based on the corresponding relative network utility measure and the corresponding relative compute utility measure;

generating a corresponding weighted joint utility vector based on the corresponding joint utility vector; and generating the global utility value based on the corresponding weighted joint utility vector.

2. The method of claim 1, wherein:

each item in the re-ordered list is an IP address pair comprising (i) an IP address for one of the multiple egress edge routers and (ii) an IP address for one of the multiple edge servers; and an egress edge router and the edge server for the client application are selectable based on the re-ordered list.

3. The method of claim 1, wherein, for each IP address in the initial list:

the corresponding set of one or more network metrics comprises two or more different network metrics;

the corresponding relative network utility measure is generated using the two or more different network metrics as vector elements in a network-metric-vector-based evaluation;

the corresponding set of one or more compute metrics comprises two or more different compute metrics;

the corresponding relative compute utility measure is generated using the two or more different compute metrics as vector elements in a compute-metric-vector-based evaluation; and the network-metric-vector-based evaluation is separate from the compute-metric-vector-based evaluation.

4. The method of claim 1, wherein, for each IP address in the initial list:

the corresponding joint utility vector is generated by:

generating a normalized network utility measure based on (i) the corresponding relative network utility measure and (ii) a best relative network utility measure for all of the IP addresses in the initial list; and generating a normalized compute utility measure based on (i) the corresponding relative compute utility measure and (ii) a best relative compute utility measure for all of the IP addresses in the initial list;

the corresponding weighted joint utility vector is generated by:

multiplying the normalized network utility measure by a network weight factor; and multiplying the normalized compute utility measure by a compute weight factor; and the global utility value is generated based on length of the corresponding weighted joint utility vector.

5. The method of claim 1, wherein the method is performed by an off-path function of the system.

6. The method of claim 5, wherein the off-path function (i) selects the edge server for the application client based on a first item in the re-ordered list and (ii) sends a message to the application client identifying the selected edge server.

7. The method of claim 5, wherein the off-path function (i) selects an egress edge router and the edge server for the application client based on a first IP address pair in the re-ordered list, (ii) sends a message to the application client with the initial list of IP addresses, and (iii) sends a message to the ingress edge router identifying the selected egress edge router and the selected edge server or a corresponding routing policy.

8. The method of claim 5, wherein the off-path function sends the re-ordered list to the application client.

9. The method of claim 5, wherein the method is performed upon receipt of a request sent by an in-path client implemented at the ingress edge router.

10. An apparatus for a system comprising an application client selectively connectable to any one of multiple edge servers by a routing network comprising (i) an ingress edge router connected to the application client and (ii) multiple egress edge routers connected variously to the multiple edge servers, each edge server of the multiple edge servers represented by a corresponding service contact point, the apparatus comprising:

at least one processor; and at least one memory storing instructions that, upon being executed by the at least one processor, cause the apparatus at least to:

receive an initial list of Internet Protocol (IP) addresses for the application client from a name resolution function of the system;

generate, for each IP address in the initial list, a global utility value based on (i) a corresponding set of one or more network metrics and (ii) a corresponding set of one or more compute metrics; and re-order the initial list based on corresponding global utility values to generate a re-ordered list of the IP addresses for the application client, wherein an edge server for the client application is selectable based on the re-ordered list, wherein generating the global utility value for each IP address in the initial list comprises:

generating a corresponding relative network utility measure based on the corresponding set of one or more network metrics;

generating a corresponding relative compute utility measure based on the corresponding set of one or more compute metrics;

generating a corresponding joint utility vector based on the corresponding relative network utility measure and the corresponding relative compute utility measure;

generating a corresponding weighted joint utility vector based on the corresponding joint utility vector; and generating the global utility value based on the corresponding weighted joint utility vector.

11. The apparatus of claim 10, wherein:

each item in the re-ordered list is an IP address pair comprising (i) an IP address for one of the multiple egress edge routers and (ii) an IP address for one of the multiple edge servers; and an egress edge router and the edge server for the client application are selectable based on the re-ordered list.

12. The apparatus of claim 10, wherein, for each IP address in the initial list:

the corresponding set of one or more network metrics comprises two or more different network metrics;

the apparatus is adapted to generate the corresponding relative network utility measure using the two or more different network metrics as vector elements in a network-metric-vector-based evaluation;

the corresponding set of one or more compute metrics comprises two or more different compute metrics;

the apparatus is adapted to generate the corresponding relative compute utility measure using the two or more different compute metrics as vector elements in a compute-metric-vector-based evaluation; and the network-metric-vector-based evaluation is separate from the compute-metric-vector-based evaluation.

13. The apparatus of claim 10, wherein, for each IP address in the initial list:

the apparatus is adapted to generate the corresponding joint utility vector by:

generating a normalized network utility measure based on (i) the corresponding relative network utility measure and (ii) a best relative network utility measure for all of the IP addresses in the initial list; and generating a normalized compute utility measure based on (i) the corresponding relative compute utility measure and (ii) a best relative compute utility measure for all of the IP addresses in the initial list;

the apparatus is adapted to generate the corresponding weighted joint utility vector by:

multiplying the normalized network utility measure by a network weight factor; and multiplying the normalized compute utility measure by a compute weight factor; and the apparatus is adapted to generate the global utility value based on length of the corresponding weighted joint utility vector.

14. The apparatus of claim 10, wherein the apparatus is adapted to operate as an off-path function of the system.

15. The apparatus of claim 14, wherein the off-path function is adapted to (i) select the edge server for the application client based on a first item in the re-ordered list and (ii) send a message to the application client identifying the selected edge server.

16. The apparatus of claim 14, wherein the off-path function is adapted to (i) select an egress edge router and the edge server for the application client based on a first IP address pair in the re-ordered list, (ii) send a message to the application client with the initial list of IP addresses, and (iii) send a message to the ingress edge router identifying the selected egress edge router and the selected edge server or a corresponding routing policy.

17. The apparatus of claim 14, wherein the off-path function is adapted to send the re-ordered list to the application client.

18. The apparatus of claim 14, wherein the off-path function is adapted to operate upon receipt of a request sent by an in-path client implemented at the ingress edge router.

* * * * *